United States Patent [19]

Kuehnl

[11] Patent Number: 4,557,238
[45] Date of Patent: Dec. 10, 1985

[54] APPARATUS FOR SUPPLYING FUEL TO AN ENGINE

[75] Inventor: Charles M. Kuehnl, Oklahoma City, Okla.

[73] Assignee: Miller-Woods Inc., Wrentham, Mass.

[21] Appl. No.: 406,278

[22] Filed: Aug. 9, 1982

[51] Int. Cl.$^4$ ............................................. F02M 51/02
[52] U.S. Cl. ....................................... 123/492; 60/605; 123/478; 123/559
[58] Field of Search ............... 123/478, 480, 492, 493, 123/559; 60/605

[56] References Cited

U.S. PATENT DOCUMENTS

| | | |
|---|---|---|
| 1,901,618 | 3/1933 | Waters et al. . |
| 2,002,482 | 5/1935 | Kimball . |
| 2,492,485 | 12/1949 | King . |
| 3,631,843 | 1/1972 | Yeiser et al. . |
| 3,716,040 | 2/1973 | Herpin . |
| 3,794,003 | 2/1974 | Reddy .............................. 123/493 X |
| 3,838,397 | 9/1974 | Watson et al. . |
| 3,911,871 | 10/1975 | Williams et al. . |
| 4,031,864 | 6/1977 | Crothers . |
| 4,064,842 | 12/1977 | Sherrill . |
| 4,091,773 | 5/1978 | Gunda .............................. 123/478 X |
| 4,096,829 | 6/1978 | Spears . |
| 4,170,040 | 10/1979 | Leblanc et al. . |
| 4,176,625 | 12/1979 | Stauffer . |
| 4,202,295 | 5/1980 | Kondo et al. .................... 123/478 X |
| 4,231,333 | 11/1980 | Thatcher et al. ................ 123/478 X |
| 4,389,994 | 6/1983 | Denz et al. ....................... 123/480 X |

FOREIGN PATENT DOCUMENTS

| | | | |
|---|---|---|---|
| 165730 | 12/1981 | Japan .................................... | 123/480 |
| 2005348 | 4/1979 | United Kingdom ................ | 123/492 |

Primary Examiner—Tony M. Argenbright
Attorney, Agent, or Firm—E. Harrison Gilbert, III

[57] ABSTRACT

The apparatus includes a speed sensing element and a pressure sensing element for sensing the speed and pressure of an internal combustion engine. The apparatus further includes multiplication circuitry for multiplying values representing the detected speed and detected pressure. The apparatus still further includes a pulse width modulation circuit which provides a control pulse having its width modulated in response to the magnitude of the multiplied speed and pressure. The apparatus further includes a circuit which disables the pulse width modulation circuit when a detected condition is below a predetermined value. The apparatus also includes a timing circuit for providing a timing signal to control the rate at which each control pulse is generated.

28 Claims, 5 Drawing Figures

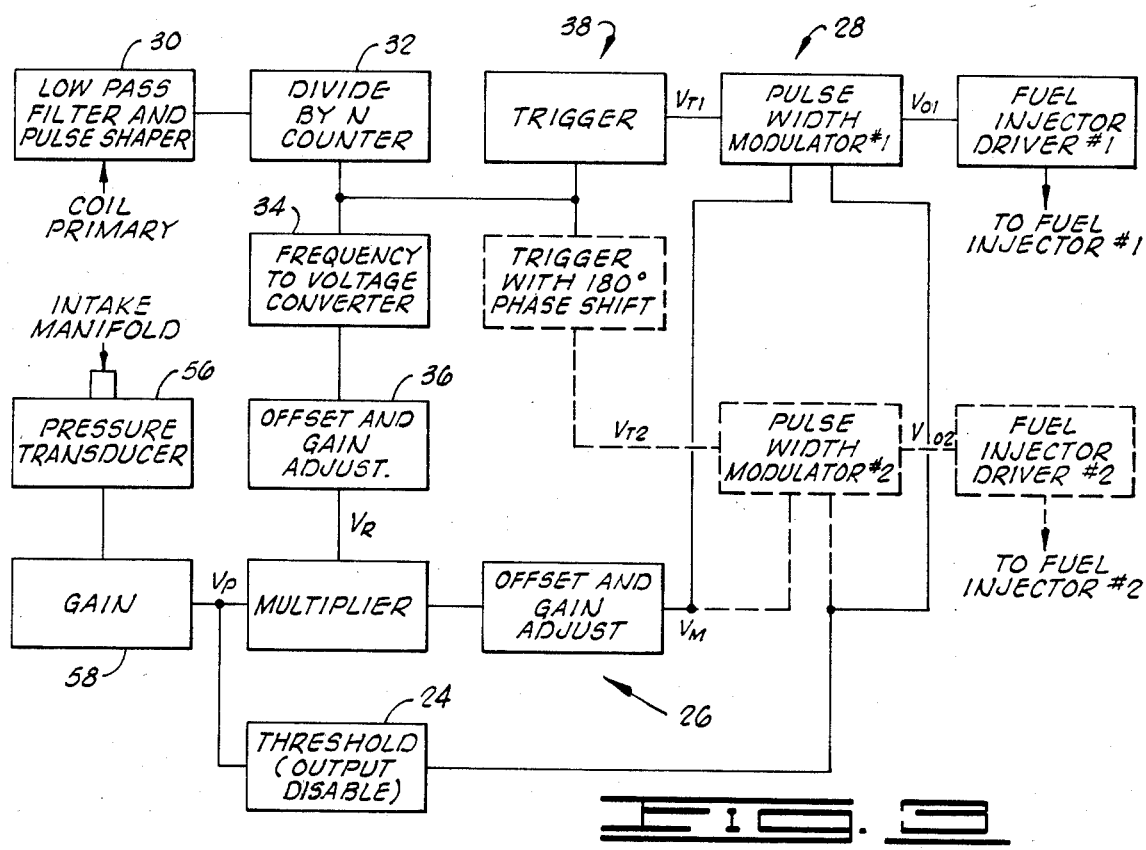
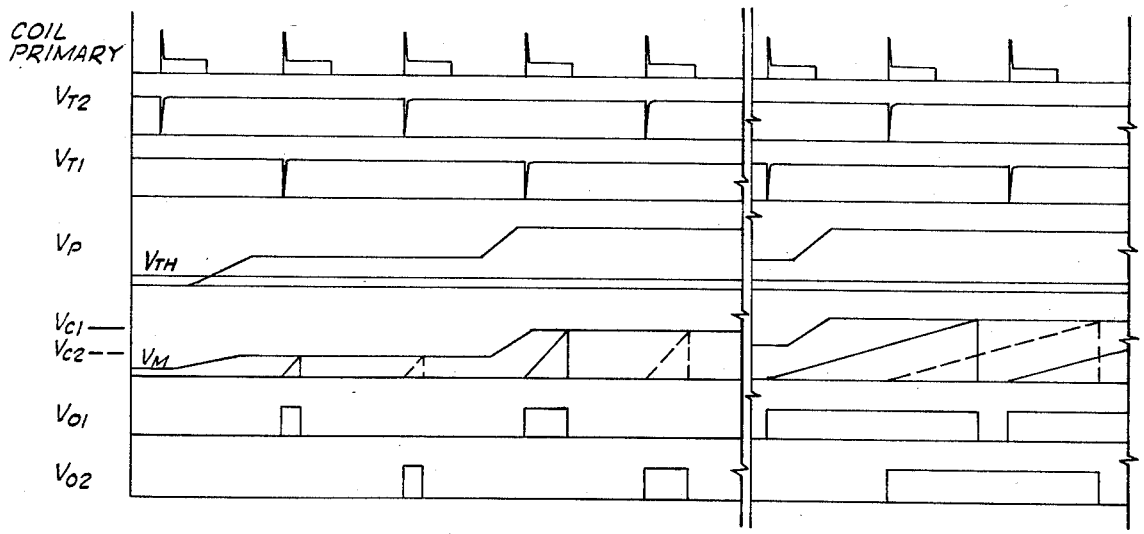

APPARATUS FOR SUPPLYING FUEL TO AN ENGINE

BACKGROUND OF THE INVENTION

This invention relates generally to apparatus for supplying fuel to an engine and more particularly, but not by way of limitation, to auxiliary fuel injection apparatus for a turbocharged, spark-ignition engine.

The fuel required by an internal combustion engine can be estimated by the equation:

$$F = \tfrac{1}{2} V_D \times N \times \eta_v \times \rho_a \times 1/AF \times 60 \text{ (lbs. fuel/hr.)} \quad (1)$$

where:

| | | |
|---|---|---|
| $V_D$ = | swept volume of the engine | (ft.$^3$) |
| $N$ = | engine speed | (rev./min.) |
| $N_v$ = | volumetric efficiency | (%) |
| $P_a$ = | air density | (lbs. air/ft$^3$) |
| $AF$ = | mass ratio of air to fuel | (lbs. air/lbs. fuel). |

If $\rho_a = \rho_{as} \times \rho_R$, where $\rho_{as}$ is the air density at standard temperature and pressure and $\rho_R$ is the density ratio of air density at a given pressure to $\rho_{as}$, then equation (1) can be rewritten as:

$$F = \tfrac{1}{2} V_D \times N \times \eta_v \times \rho_{as} \times \rho_R \times 1/AF \times 60 \text{ (lbs.fuel/hr.)} \quad (2)$$

For a naturally aspirated engine (i.e., one which is not supercharged) and neglecting temperature effects, it can be assumed that $\rho_R$ approximately equals 1. Further assuming that the mass ratio of air to fuel (AF) is constant at a wide open throttle setting of the engine and that the change in the volumetric efficiency ($\eta_v$) is negligible over the engine speed range, then the only variable in the preceding equation is engine speed (N). Under these assumptions, equation (2) reduces to, for a naturally aspirated engine:

$$F_{NA} \times K_{NA} \times N, \quad (3)$$

where $$K_{NA} = \tfrac{1}{2} V_D \times \eta_v \times \rho_{as} \times 1/AF \times 60.$$

By setting N to its maximum value, one can determine the maximum fuel requirement of the engine under the foregoing assumptions. Knowing the maximum fuel requirements of the engine under naturally aspirated conditions, one also has an indication of the maximum fuel delivery capability of the engine's original or stock fuel system supplied by the manufacturer.

When the engine is supercharged, such as by a turbocharger for example, $\rho_R$ can increase to values significantly greater than unity due to the increase in pressure in the intake manifold of the engine. At wide open throttle with a properly designed turbocharger system, the intake manifold pressure (i.e., boost) will reach a maximum value at a relatively low engine speed. Therefore, for a turbocharged (or, more generally, supercharged) engine, $\rho_R$ can be assumed to be constant over most of the engine speed range. However, because $\rho_R$ is greater than unity, the total fuel requirement for a turbocharged engine is approximated by:

$$F_{TC} = K_{NA} \times N \times \rho_R \quad (4)$$

By subtracting equation (3) from equation (4), the additional fuel required in a turbocharged engine over that required in a naturally aspirated engine is:

$$F_A = K_{NA} \times N \times (\rho_R - 1). \quad (5)$$

Because most original manufacturers' fuel systems deliver fuel in proportion to detected air flow, it can be assumed that the fuel flow will be metered correctly by the original system until the air flow exceeds the maximum naturally aspirated air flow at maximum engine speed. Therefore, the additional fuel which needs to be added by a supplemental fuel supplying apparatus is indicated by the equation:

$$F_A = K_{NA} |N\rho_R - N_{max}| \quad (6)$$

Under supercharged conditions, it is apparent from the foregoing that if additional fuel is not added to the engine, the air-fuel ratio will increase into the lean region which is potentially dangerous to the engine. Such a condition creates the potential for detonation which could destroy the engine. This condition arises from the inability of the original fuel system to supply the additional fuel needed under supercharged conditions.

To overcome the deficiency of the original manufacturer's fuel system and thus to reduce the potential for detonation there are three alternatives of which I am aware. The first alternative is to add water (or a water-methanol mixture) to the intake air charge in the engine. The water reduces the intake charge temperature and the water becomes steam in the combustion chamber, thereby reducing the potential for detonation and enabling the engine to be more safely operated at a higher boost and at a leaner air-fuel ratio. Unfortunately, water, even mixed with a combustible fluid like methanol, does little to increase the power output of the engine. Additionally, to add such a substance or substances to the intake air charge requires a separate, secondary fuel system (fluid reservoir, pump, etc.) which must be properly maintained for safe engine operation. This alternative also has a limited capability of preventing detonation.

The second alternative of which I am aware is to retard the ignition point in either stepped or continuous response to manifold pressure as known to the art. Modification of the ignition point may be accomplished with or without any addition of an anti-detonant fluid, such as fuel or water. It is to be noted, however, that such retardation of the ignition point can adversely affect the engine operation by reducing the power output because the combustible mixture has an insufficient time to completely burn. Additionally, if the combustible mixture has an insufficient time to burn in the combustion chamber, the mixture will still be burning as it leaves the combustion chamber, thereby exposing all the components in the exhaust system (e.g., the exhaust valves and the turbocharger turbine) to potentially destructive exhaust gas temperatures. Retardation of the ignition point also reduces the engine's efficiency as measured by the brake specific fuel consumption value which measures the engine's efficiency in fuel consumption per hour per horsepower. Therefore, the useful effect of this method is limited.

The third alternative of which I am aware is to add more of the primary fuel to the intake air charge. I am aware of prior systems which add fuel with an increase in boost either in step changes at one or more predetermined pressures or continuously in proportion to boost. Neither of these types of systems, however, provides the desired air-fuel ratio until the engine speed approaches its maximum. Therefore, the engines with which these systems are used give less than their maximum power outputs, and the engines consume an excessive amount of fuel (i.e., more fuel than is required for proper performance) at low and middle engine speeds. Additionally, in some of these prior systems the fuel is added by varying the pressure differential across a fixed orifice in proportion to boost, thereby making the degree of fuel atomization, and thus the homogeneity of the air-fuel charge, a function of boost. This relationship causes the air-fuel charge to be non-uniform which adversely affects (or at least fails to enhance) the operation of the engine.

Therefore, there is the need for an apparatus for supplying additional fuel to an engine when the capacity of the original manufacturer's fuel system accompanying the engine is incapable of meeting the fuel requirements for maintaining proper air-fuel ratios. There is also the need for this apparatus to increase the power output and fuel economy of the engine over power output and fuel consumptions of prior devices which have been designed or developed to add fuel to an engine. To meet this need of increased power output and fuel economy, there is the further need for the apparatus to continuously control the air-fuel ratio when the engine intake air pressure exceeds the pressure of the maximum naturally aspirated air flow at maximum engine speed. There is also the need for the additional fuel to be added so that the combustible air-fuel charges are homogeneous.

SUMMARY OF THE INVENTION

The present invention overcomes the above-noted and other shortcomings of the prior art by providing a novel and improved apparatus for supplying fuel to an engine. This apparatus meets the aforementioned needs in that it supplements the original manufacturer's fuel system to provide fuel to the engine when pressures above a maximum naturally aspirated air flow are encountered. The apparatus also permits the additional fuel to be injected so that the combustible air-fuel charges are homogeneous. Thus, the present invention increases power output and fuel economy in engines.

Broadly, the present invention comprises speed sensing means for sensing the speed of an engine and pressure sensing means for sensing a pressure in the engine. The apparatus also includes multiplier means for multiplying the sensed speed by the sensed pressure and modulation means for generating a control signal for controlling a fuel system of the engine in response to the multiplier means. The control signal is proportional to the multiplied sensed speed and pressure. The apparatus further comprises threshold means for disabling the modulation means when the sensed pressure or air flow is below a predetermined value. The apparatus also includes timing means for providing a timing signal to the modulation means so that the control signal is generated in response to the engine speed or at a predetermined time period.

From the foregoing, it is a general object of the present invention to provide a novel and improved apparatus for supplying fuel to an engine. Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIG. 3 is a more detailed functional block diagram of the preferred embodiment of the present invention.

FIG. 5 is a set of exemplary timing diagrams.

DETAILED DESCRIPTION OF THE PREFERRED EMBODIMENTS

Figure 1:
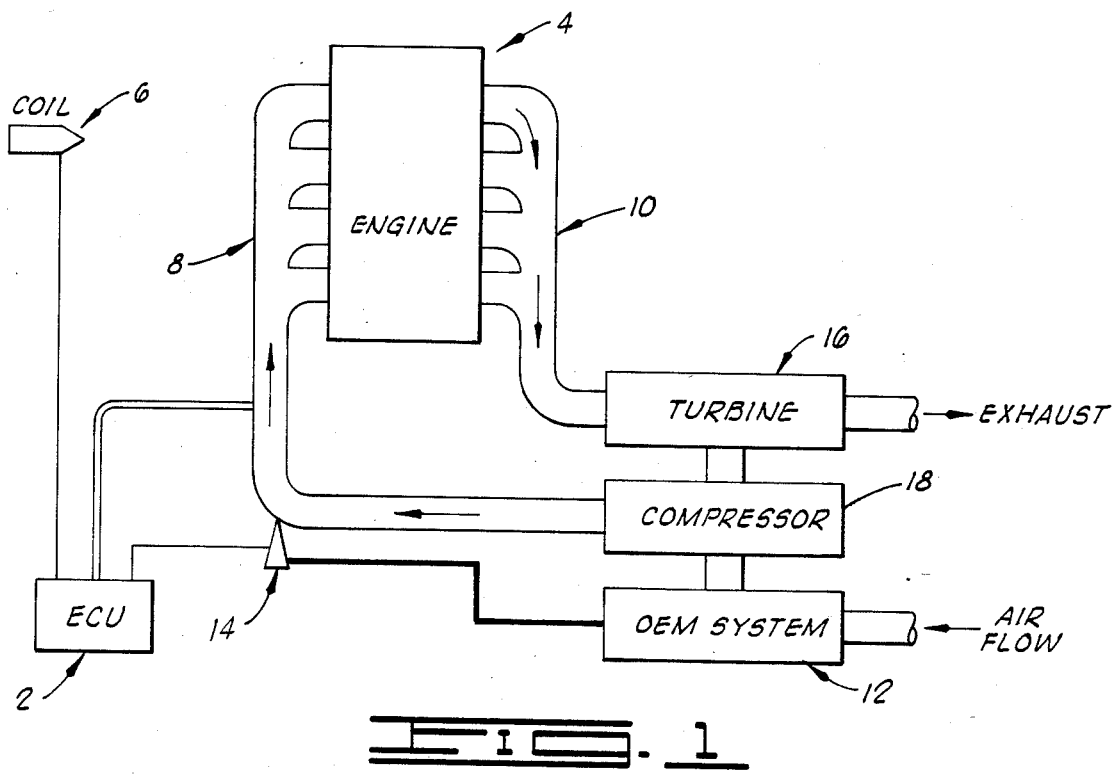
FIG. 1 is a schematic illustration showing the present invention associated with an engine.

With reference to the drawings, an apparatus 2 constructed in accordance with the preferred embodiment of the present invention will be described. As illustrated in FIG. 1, the apparatus 2 (identified as an electronic control unit, "ECU") supplies fuel to an engine 4. The engine 4 has a number, n, of cylinders. For the preferred embodiment of the present invention n is four, five, six or eight. In other words, the engine 4 is ordinarily a four-cylinder, five-cylinder, six-cylinder or eight-cylinder engine; however, the present invention can be used with other types of engines. In FIG. 1 the engine 4 is illustrated as a four-cylinder engine.

The cylinders have an air-fuel mixture provided to them as known in the art. The air-fuel mixture is spark ignited by a distributor coil 6 having a primary winding through which an electrical pulse passes for each ignition of one of the cylinders as known to the art.

The engine 4 has an intake air system including an intake manifold 8. The engine 4 also includes an exhaust air system including an exhaust manifold 10.

It is contemplated that the engine 4 is to be used with a fuel system of a type known to the art, such as an original equipment manufacturer's fuel system 12 having an appropriate fuel reservoir, pump and fluid lines as known to the art. Examples of fuel systems with which the present invention is contemplated to be used include the Bosch K-Jetronic system and the Bosch L-Jetronic system. As shown in FIG. 1 there is a fuel injector 14 of a type known to the art associated with the fuel system 12 by a suitable fuel line when the apparatus 2 is used with the engine 4.

The engine 4 also is shown in FIG. 1 to be superchargeable in that it is associated with a turbocharger including a turbine 16 and a compressor 18 connected as illustrated in FIG. 1 and as known to the art. It is to be noted that the fuel injector 14 can be connected to inject into the intake charge either before or after the compressor 18, and it is to be further noted that the apparatus 2 can operate with engines that are supercharged by means other than turbochargers.

Figure 2:
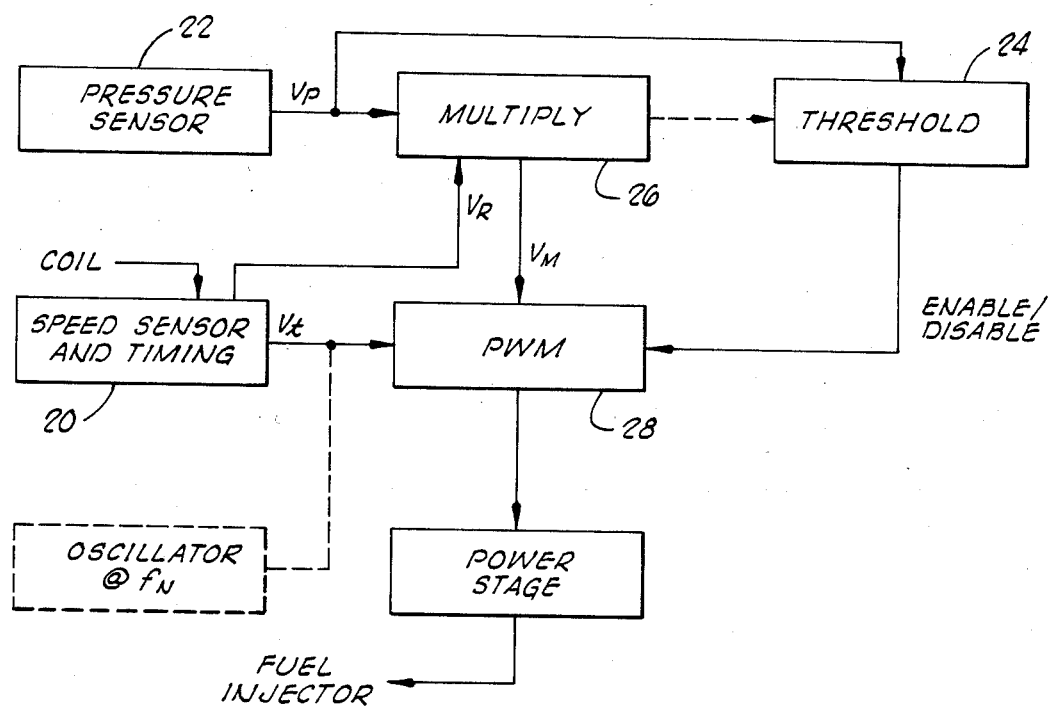
FIG. 2 is a functional block diagram illustrating the functional elements of the present invention.
Figure 4:
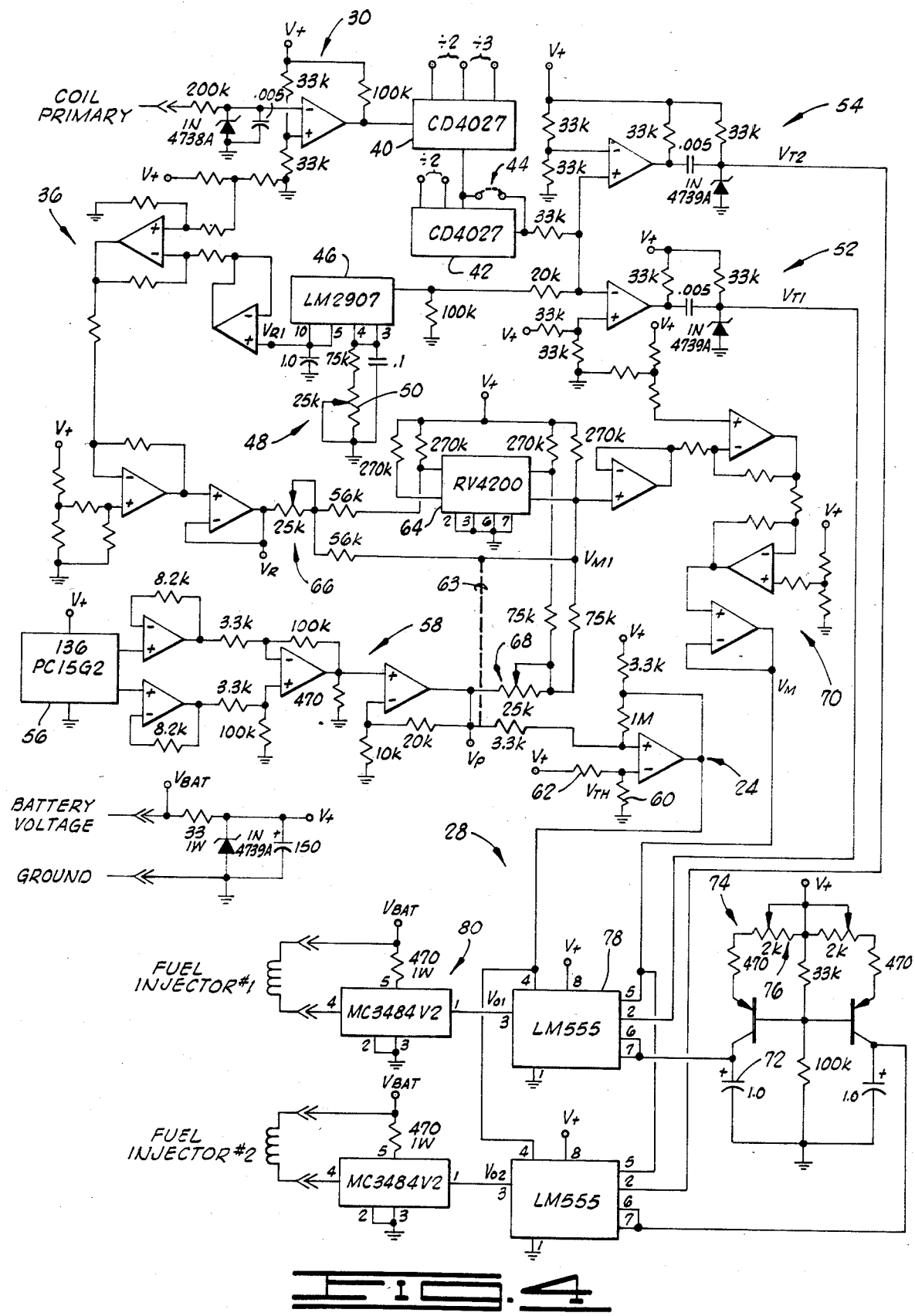
FIG. 4 is a schematic circuit diagram of the preferred embodiment circuit implementing the features shown in FIGS. 2 and 3.

Referring now to FIGS. 2-4, the apparatus 2 will be more particularly described. FIG. 2 broadly illustrates that the apparatus 2 includes a speed sensor and timing means 20, a pressure sensing means 22, a threshold means 24, a multiplier means 26, and a modulation means 28, identified specifically as a pulse width modulation ("PWM") means. These functional elements are constructed and operated as will be more particularly described hereinbelow to properly actuate the fuel injector 14 to supply additional fuel to the air-fuel charge in the intake air system of the engine 4 when the air pressure in one embodiment, or the air flow rate in another embodiment, in the intake manifold 8 exceeds a predetermined value.

Generally, the speed sensor and timing means 20 senses the speed of the engine and converts it into a corresponding voltage, $V_R$, which is provided to the multiplier means 26. The speed sensor and timing means also provides a timing signal, $V_t$, to the modulation means 28 in response to the speed of the engine 4. The pressure sensing means 22 senses a pressure in the engine 4 and provides a pressure-proportional voltage, $V_p$, to the multiplier means 26. The voltage $V_p$ is also provided to the threshold means 24 which in turn provides a disabling signal to the modulation means 28 when the detected pressure is below a predetermined value. The multiplier means 26 multiplies $V_R$ by $V_P$ and provides a product signal, $V_m$, to the modulation means 28. The modulation means 28 generates a control signal for controlling the fuel system 12 in response to the disable signal, the timing signal $V_t$, and the modulation voltage $V_m$. In an alternative embodiment the threshold means 24 is responsive to the product of the multiplier means 26, rather than to $V_p$ directly, and thereby provides the disable signal based on detected air flow rather than directly on detected pressure. Thus, the threshold means 24 may be generally referred to as a means for disabling the modulation means when a condition proportional to the sensed pressure is below a predetermined value.

It is to be noted that as used herein the phrases "speed of the engine" or "revolutions of the engine" or ones similar thereto refer to the speed or revolutions of the crankshaft of the engine and, of course, not of the engine as a whole.

The speed sensor and timing means 20 is shown in FIG. 3 to more particularly include a low-pass filter and pulse shaper means 30, divider means 32, and frequency-to-voltage converter means 34 having an offset and gain adjustment means 36 associated therewith. The speed sensor and timing means 20 further includes trigger means 38.

The low-pass filter and pulse shaper means 30 is shown in FIG. 4 as a means for detecting an electrical spark-generating signal received from the distributor coil primary winding to which the low-pass filter and pulse shaper means 30 is connectable. In the preferred embodiment, the electrical spark-generating signal includes the ignition pulses from the distributor coil primary winding. The detected ignition pulses are converted by the low pass filter and pulse shaper means 30 into a corresponding electrical signal having, in the preferred embodiment, pulses equal in number to those detected in the primary winding. The low-pass filter and pulse shaper means 30 is constructed in the preferred embodiment as shown in FIG. 4.

The divider means 32 divides the number of detected ignition pulses (more particularly, the pulses in the signal received by the divider means 32 from the low-pass filter and pulse shaper means 30) by a predetermined number. In the preferred embodiment the predetermined number is the integer part of n/2, where n is the number of cylinders in the engine 4. By so dividing the signal received at the input of the divider means 32, the divider means 32 provides at its output an analog speed signal having a frequency wherein each cycle thereof represents one revolution of the engine 4.

In the preferred embodiment circuit shown in FIG. 4, the divider means 32 includes two integrated circuit divider chips 40, 42. By appropriately connecting the pins of the integrated circuit chip 40 in a manner known to the art, and as illustrated in FIG. 4, the integrated circuit chip 40 can function as either a divide-by-2 divider when the apparatus 2 is used with a four-or five-cylinder engine or as a divide-by-3 divider when the apparatus 2 is used with a six-cylinder engine. In either of these two cases, the integrated circuit chip 42 is bypassed by a jumper 44. However, if the apparatus 2 is to be used with an eight-cylinder engine, the jumper 44 is removed and the integrated circuit chips 40, 42 are each appropriately strapped to function as divide-by-2 dividers, thereby dividing the input signal between the input of the integrated circuit chip 40 and the output of the integrated circuit chip 42 by a factor of four.

The frequency-to-voltage converter means 34 converts the analog speed signal from the divider means 32 into a voltage which is proportional to the frequency of the analog speed signal and thus also to the detected electrical pulses from the distributor coil primary winding. In the preferred embodiment illustrated in FIG. 4, the frequency-to-voltage converter means 34 includes an integrated circuit chip 46 of the type indicated in the drawing. The chip 46 provides a voltage, $V_{R1}$, at its output. The magnitude of $V_{R1}$ is controlled by the resistor-capacitor (RC) circuit 48 attached to the chip 46 as illustrated. The RC circuit 48 includes a resistor 50 which is used to adjust for the engine speed at which $V_{R1}$ is to reach its maximum value.

Associated with the frequency-to-voltage converter means 34 is the offset and gain adjustment means 36, generally illustrated in FIG. 4 and specifically constructed as known to those in the art. Each of the operational amplifiers of the offset and gain adjustment means 36 shown in FIG. 4 is set for approximately unity gain. The offset and gain adjustment means 36 is used to scale the voltage $V_{R1}$ in accordance with the response time of the fuel injector 14 with which the apparatus 2 is used. The offset and scale adjustment means 36 is also used to adjust the voltage $V_{R1}$ for an equivalence with the equation (6) identified hereinabove and as will be more particularly described hereinbelow. In the preferred embodiment the output of the offset and scale adjustment means 36 provides the voltage $V_R$.

The trigger means 38 of the preferred embodiment converts the analog speed signal from the divider means 32 into a timing signal which is used by the modulation means 28. In the preferred embodiment the trigger means 38 specifically generates the timing signal for each cycle of the frequency of the analog speed signal. As shown in FIGS. 3 and 4, the trigger means 38 includes means for generating two triggering or timing signals, $V_{T1}$, $V_{T2}$. Such dual signals are necessary only if two fuel injectors are to be controlled. If one injector is to be controlled, one of the two means is deleted as indicated by the dashed line portion shown in FIG. 3. With reference to the FIG. 4 embodiment, the dual triggering or timing circuits are identified by the reference numerals 52, 54. Circuit 54 is the one to be omitted if only one fuel injector is to be controlled by the apparatus 2. It is to be further noted that in FIG. 2 an alternative embodiment of the trigger means 38 is illustrated in dashed lines. In this alternative embodiment, the timing signal can be provided by an oscillator set to operate at an appropriate fixed frequency, such as the frequency corresponding to the maximum operating speed of the engine 4.

The pressure sensing means 22 of the preferred embodiment senses the air pressure in the intake manifold 8 and generates a voltage, $V_p$, proportional to the sensed air pressure. As shown in FIGS. 3 and 4, the pressure sensing means 22 includes a pressure transducer means 56 and a gain circuit means 58 of the types known to the art. In the preferred embodiment the pressure transducer means 56 is particularly an internally temperature-compensated piezoresistive sensor attached to a suitable location in the intake manifold 8. The pressure transducer means 56 generates a voltage proportional to the air pressure and provides that signal to the gain circuit means 58 which appropriately amplifies the signal into the pressure indicating voltage, $V_p$.

In the first embodiment illustrated in FIG. 4 the threshold means 24 functions as a pressure threshold means by comparing the voltage, $V_p$, to a predetermined pressure threshold voltage, $V_{TH}$, and generating a disable signal when $V_p$ is less than $V_{TH}$. As shown in FIG. 4, the threshold means 24 of the preferred embodiment includes a comparator circuit of a type known to the art. The threshold level, $V_{TH}$, is set by resistors 60, 62 as known to the art. In the preferred embodiment the values are selected to set the threshold voltage as an equivalence of approximately one pound per square inch (gauge) of pressure in the intake manifold 8, which is one pound per square inch (gauge) greater than the pressure of the maximum naturally aspirated air flow, namely atmospheric pressure or zero pounds per square inch (gauge).

In an alternative preferred embodiment the threshold means 24 functions as an air flow threshold means by connecting the noninverting input of the comparator circuit to a product voltage, $V_{m1}$, of $V_R$ and $V_p1$, rather than to $V_p1$, as illustrated in FIG. 2 by the dashed line from the multiplier means 26 to the threshold means 24 and in FIG. 4 by the dashed line marked with the reference numeral 63. The threshold means 24 thereby becomes responsive to air flow in the intake manifold 8 because the air flow rate therein is proportional to engine speed and intake manifold air pressure. The threshold level is again set by the particular values selected for resistors 60, 62.

The multiplier means 26 multiplies $V_R$ and $V_p$ to derive a product voltage, $V_m$, which is a modulation voltage used by the modulation means 28. In the preferred embodiment the multipler means 26 includes a multiplier circuit and an offset and gain adjustment circuit as indicated in FIG. 3. The multipler circuit is shown in FIG. 4 to specifically include in the preferred embodiment an integrated circuit multiplier chip 64 and fine tuning resistors 66, 68 for appropriately scaling the multiplier means as known to the art. The preferred embodiment of the offset and gain adjustment circuit is identified in FIG. 4 by the reference numeral 70. The offset and gain adjustment circuit 70 is used for adjusting the output of the multiplier chip 64 in accordance with the response time of the fuel injector means 14. The voltage $V_m$ is provided at the output of the offset and gains line is offset adjustment circuit 70 as shown in FIG. 4.

The modulation means 28 responds to the timing signal from the trigger means 38, the disable signal from the threshold means 24, and $V_m$, the modulation voltage from the multiplier means 26. In response to these inputs, the modulation means 28 generates a control signal proportional to $V_m$ for controlling the fuel injection means 14. FIGS. 3 and 4 depict dual modulation circuits for generating output signals $V_{01}$, $V_{02}$ so that two fuel injectors can be controlled thereby. The second modulation circuit is indicated in FIG. 3 by the dashed lines. The additional modulation circuit illustrated in FIG. 4 is that one which is responsive to the triggering signal from the trigger means circuit 54. With reference to FIG. 4, the preferred embodiment of the modulation means will be described with respect to only one of the modulation circuits.

The preferred embodiment of the modulation means 28 includes capacitance means for charging towards a predetermined voltage. As shown in FIG. 4 the capacitance means includes a capacitor 72 and a charging circuit 74 having a variable resistor 76 for adjusting the charging rate of the capacitor 72. The charging circuit 74 functions as a constant current source and in the preferred embodiment charges the capacitor 72 at a charging rate of approximately 0.9 volts per millisecond.

The modulation means 28 also includes control means for preventing the capacitance means from charging when the disable signal is provided to the modulation means by the pressure threshold means 24. The control means also enables the capacitance means to charge toward the predetermined voltage when the timing signal from the trigger means circuit 52, but no disable signal from the threshold means 24, are provided to the modulation means.

The modulation means 28 also includes comparison means for comparing the voltage of the capacitance means to the multiplied speed and air pressure represented by the voltage $V_m$. The modulation means also includes control signal generator means for commencing a pulse of the control signal when the capacitance means is enabled by the control means and for maintaining the pulse until the comparison means determines that the voltage of the capacitance means equals the multiplied speed and air pressure signal $V_m$.

In the preferred embodiment the control means, the comparison means and the control signal generator means are embodied in a single integrated circuit, such as a Model LM555 integrated circuit timer chip 78. In FIG. 4, the chip 78 is labeled LM555 because the illustrated pin connections are for a Model 555 single timer; however, the chip 78 may be implemented by one portion of a Model 556 dual timer. In the integrated circuit chip 78 there is provided reset means for receiving the disable signal, trigger means for receiving the timing signal, and control voltage means for receiving the modulation voltage $V_m$. Integrated circuit chip 78 also includes capacitor threshold means for receiving the voltage to which the capacitor 72 charges. The integrated circuit chip 78 still further includes discharge means for discharging the capacitor 72 when either the reset means or an internal comparator means which compares the voltage of the capacitor with $V_m$ appropriately activates the discharge means which in the preferred embodiment is a transistor which pulls the capacitor 72 to ground when the transistor is activated.

The modulation means 28 has associated therewith fluid injector driver means 80 shown in FIG. 4 and functionally disclosed in FIGS. 2 and 3. The driver means 80 receives the control signal from the integrated circuit means 78 and suitably energizes a coil of the fuel injection means 14.

It is to be noted that in FIG. 4 specific values and component model numbers are given; however, it is also to be noted that the present invention is not to be limited by such values and model numbers. It is also to be noted that capacitor values are shown in microfarads and resistance values are shown in ohms.

Through proper selection of gain, threshold levels and fuel injector flow rates which are within the knowledge of, or readily ascertainable by, those in the art, the apparatus 2 can be made to provide additional fuel in amounts approximating the amounts indicated to be needed by equation (6) set forth hereinabove. The actual fuel flow is accomplished by means of the control pulses in the control signal generated by the modulation means 28. To control the width of each output pulse, the voltage $V_m$ is compared to the voltage of the capacitor 72 which in the preferred embodiment is enabled to charge once each revolution of the engine. The maximum duration of the pulse is controlled by setting the charging rate on the capacitor 72 so that the capacitor voltage, $V_c$, can reach any maximum $V_m$ in less time than the period of one revolution of the engine at the maximum engine speed. The start timing of the pulses in the control signal is provided by the timing signal generated in response to the analog speed signal which in the preferred embodiment has been manipulated to provide one pulse or cycle for each revolution of the engine. Because the control pulse starts when the capacitor 72 is enabled to charge, the fuel injector 14 is energized to initiate fuel flow simultaneously with the charging of the capacitor 72. When the capacitor voltage $V_c$ reaches $V_m$, the capacitor is discharged and held so until the next engine revolution occurs.

With reference to the timing diagram shown in FIG. 5, the operation of the present invention will be more particularly described with reference to a specific example. For the timing diagrams shown in FIG. 5 it is assumed that the engine 4 is a four-cylinder engine; therefore, two ignition pulses per revolution of the engine are generated by the distributor coil and detected by the speed sensor and timing means 20. For the left portion of the timing diagrams, it is assumed that there is a ten millisecond period between the coil pulses; therefore, two pulses (or one revolution) occur every twenty milliseconds which translates to an engine speed of fifty revolutions per second or 3,000 revolutions per minute of the engine 4. For the right portion of the timing diagrams it is assumed that the pulse period is 5 milliseconds or 10 milliseconds for two pulses or one revolution; therefore, the speed of the engine depicted in the right-hand portion is 6,000 revolutions per minute. The charging time of the capacitor for the right-hand portion of the timing diagrams is also different from the charging time of the capacitor for the left-hand portion of the timing diagrams. The vertical axes of the timing diagrams are not drawn to a particular scale, but are rather drawn to show relative relationships.

Under the foregoing assumptions, the divider integrated circuit chip 40 is strapped to be in its divide-by-2 mode and the jumper 44 is connected so that the division capabilities of the chip 42 are not used. This connection of the divider means 32 yields an analog speed signal having one pulse or cycle every twenty milliseconds for the left-hand portion of the timing diagrams. In response to this analog speed signal the trigger means 38 provides the timing signals $V_{T1}$, $V_{T2}$ as shown in FIG. 5.

Considering the left-hand portion of the timing diagrams and assuming a pressure as indicated by the $V_p$ diagram and the accompanying threshold voltage, $V_{TH}$, and a constant speed $V_R$ (i.e., 3,000 rpm), $V_m$ is as shown in FIG. 5.

As previously mentioned, the magnitude of $V_m$ modulates the duration of the charge of the capacitor 72 and thus also modulates the width of the control signals $V_{01}$, $V_{02}$ when the modulation means 28 is not disabled. That is for the first embodiment where the threshold means 24 monitors $V_p$, when $V_p$ is above the threshold level, $V_{TH}$, the capacitor 72 will begin charging upon receipt by the integrated circuit 78 of the trigger means timing signal $V_{T1}$. The capacitor 72 will charge until the internal comparator means in the integrated circuit chip 78 determines that the capacitor voltage $V_c$ ($V_{c1}$ in FIG. 5) equals $V_m$. When this occurs, the discharge means of the integrated circuit chip 78 discharges the capacitor 72 and disables the output thereby terminating the pulse of $V_{01}$.

Similar controls occur for the second channel of the modulation means as indicated in the timing diagrams labeled with the subscript numerals 2. With reference to $V_{T2}$, it is to be noted that at the first pulse thereof shown in FIG. 5, $V_p$ is not above $V_{TH}$; therefore no $V_{02}$ pulse is generated.

In this way, the fuel delivered to the engine 4 can be metered properly even though the air flow exceeds the range to which the original manufacturer's fuel system can properly respond; therefore, a proper air-fuel ratio can be maintained throughout the range of engine speed and boost. Furthermore, because the fuel pressure supplied to the injector 14 is the maximum system pressure of the original manufacturer's fuel system, atomization of the fuel is primarily a function of injector sizing, not of boost. This reduces the amount of fuel in the liquid phase in the intake charge and provides for a uniform air-fuel charge in the intake manifold.

It is to be noted that the apparatus 2 of the present invention can be implemented by means of a microcomputer which can more readily handle the calculations necessary to more closely approach the equations referred to hereinabove and to more easily implement these equations under fewer assumptions thereby more closely approaching the idealized control of the engine.

Thus, the present invention is well adapted to carry out the objects and attain the ends and advantages mentioned above as well as those inherent therein. While preferred embodiments of the present invention have been described for the purpose of this disclosure, numerous changes in the construction and arrangement of parts can be made by those skilled in the art, which changes are encompassed within the spirit of this invention as defined by the appended claims.

What is claimed is:

1. An apparatus for supplying fuel to an engine having a fuel system which includes a primary fuel supply system and an auxiliary fuel injector associated therewith, said apparatus comprising:

speed sensing means for sensing the speed of the engine;

pressure sensing means for sensing a pressure in the engine;

multiplier means for multiplying the sensed speed by the sensed pressure;

modulation means, responsive to said multiplier means, for generating a control signal for controlling the auxiliary fuel injector to supply additional fuel to the engine in supplementation of the fuel provided by the primary fuel supply system, said control signal being proportional to the mutliplied sensed speed and pressure; and threshold means for disabling said modulation means when a condition proportional to the sensed pressure is below a predetermined value, said predetermined value being selected to indicate a supercharged condition.

2. An apparatus as defined in claim 1, wherein said condition is the sensed pressure.

3. An apparatus as defined in claim 1, wherein said condition is an air flow rate in the engine.

4. An apparatus as defined in claim 1, further comprising timing means for providing a timing signal to said modulation means once during each revolution of the engine.

5. An apparatus for controlling an application of fuel to an engine having an intake air system, a primary fuel supply system and fuel injection means for providing additional fuel flow in excess of the maximum fuel flow which the primary fuel supply system can provide, said apparatus comprising:

speed sensing means for sensing the speed of the engine;

timing means, responsive to said speed sensing means, for providing a timing signal;

pressure sensing means for sensing the air pressure in the intake air system;

pressure threshold means, responsive to said pressure sensing means, for providing a disable signal when said sensed air pressure is below a predetermined value;

multiplier means for multiplying the sensed speed by the sensed air pressure; and modulation means, responsive to said disable signal and said timing signal, for generating a control signal for controlling said fuel injection means, said control signal having a duration proportional to the multiplied speed and air pressure.

6. An apparatus as defined in claim 5, wherein:

said engine includes a number, n, of cylinders to which electrical pulses are provided; and said speed sensing means includes:
means for detecting said electrical pulses;
divider means for dividing the number of detected electrical pulses by the integer of n/2, thereby providing a speed signal having a frequency; and
frequency-to-voltage converter means for converting said frequency into a voltage.

7. An apparatus as defined in claim 6, wherein said timing means includes trigger means for converting said speed signal into said timing signal.

8. An apparatus as defined in claim 7, wherein said modulation means includes:

capacitance means for charging toward a predetermined voltage;

control means for preventing said capacitance means from charging when said disable signal is provided to said modulation means and for enabling said capacitance means to charge when said timing signal and no disable signal are provided to said modulation means;

comparison means for comparing the voltage of said capacitance means to the multiplied speed and air pressure; and control signal generator means for commencing a pulse of said control signal when said capacitance means is enabled by said control means and for maintaining said pulse until said comparison means determines the voltage of said capacitance means equals the multiplied speed and air pressure.

9. An apparatus as defined in claim 5, wherein said modulation means includes:

capacitance means for charging toward a predetermined voltage;

control means for preventing said capacitance means from charging when said disable signal is provided to said modulation means and for enabling said capacitance means to charge when said timing signal and no disable signal are provided to said modulation means;

comparison means for comparing the voltage of said capacitance means to the multiplied speed and air pressure; and control signal generator means for commencing a pulse of said control signal when said capacitance means is enabled by said control means and for maintaining said pulse until said comparison means determines the voltage of said capacitance means equals the multiplied speed and air pressure.

10. An apparatus for adding fuel to a spark-ignition engine including an intake manifold and a fuel injector, said apparatus comprising:

detector means for sensing the speed of the engine and for generating an electrical signal corresponding to the sensed speed;

divider means for dividing said corresponding electrical signal by a predetermined number, thereby providing an analog speed signal having a frequency;

frequency-to-voltage converter means for converting said analog speed signal into a voltage, $V_R$, proportional to the frequency of said analog speed signal;

timing means for generating a timing signal for each cycle of the frequency of said analog speed signal;

pressure sensing means for sensing the air pressure in the intake manifold and for generating a voltage, $V_p$, proportional to the sensed air pressure;

pressure threshold means for comparing $V_p$ to a predetermined threshold voltage having a magnitude representing not less than approximately the magnitude of the pressure of the maximum naturally aspirated air flow of the engine at the maximum speed of the engine and for generating a disable signal when $V_p$ is less than said predetermined threshold voltage;

multiplier means for multiplying $V_R$ and $V_p$ to derive a modulation voltage, $V_m$; and modulation means, responsive to said timing signal, said disable signal and said $V_m$, for generating a control signal for controlling the fuel injector.

11. An apparatus as defined in claim 10, wherein said modulation means includes:

a capacitor; and
integrated circuit means including:
reset means for receiving said disable signal;
trigger means for receiving said timing signal;
control voltage means for receiving said $V_m$;
discharge means for discharging said capacitor; and
capacitor threshold means for receiving a voltage to which said capacitor charges when said discharging means is not discharging said capacitor means.

12. An apparatus as defined in claim 11, wherein each cycle of the frequency of said analog speed signal represents one revolution of the engine.

13. An apparatus as defined in claim 12, wherein said detector means includes low-pass filter means.

14. An apparatus as defined in claim 10, wherein each cycle of the frequency of said analog speed signal represents one revolution of the engine.

15. An apparatus as defined in claim 10, wherein said modulation means includes:
- capacitance means for charging toward a predetermined voltage;
- control means for preventing said capacitance means from charging when said disable signal is provided to said modulation means and for enabling said capacitance means to charge when said timing signal and no disable signal are provided to said modulation means;
- comparison means for comparing the voltage of said capacitance means to said $V_m$; and
- control signal generator means for commencing a pulse of said control signal when said capacitance means is enabled by said control means and for maintaining said pulse until said comparison means determines the voltage of said capacitance means equals said $V_m$.

16. An apparatus for controlling an application of fuel to an engine having an intake air system, a primary fuel supply system and fuel injection means for providing additional fuel flow in excess of the maximum fuel flow which the primary fuel supply system can provide, said apparatus comprising:
- speed sensing means for sensing the speed of the engine;
- timing means, responsive to said speed sensing means, for providing a timing signal;
- pressure sensing means for sensing the air pressure in the intake air system;
- multiplier means for multiplying the sensed speed by the sensed air pressure;
- air flow threshold means, responsive to said multiplier means, for providing a disable signal when the sensed air flow is below a predetermined value; and
- modulation means, responsive to said disable signal and said timing signal, for generating a control signal for controlling said fuel injection means, said control signal having a duration proportional to the multiplied speed and air pressure.

17. An apparatus as defined in claim 16, wherein:
- said engine includes a number, n, of cylinders to which electrical pulses are provided; and
- said speed sensing means includes:
  - means for detecting said electrical pulses;
  - divider means for dividing the number of detected electrical pulses by the integer of n/2, thereby providing a speed signal having a frequency; and
  - frequency-to-voltage converter means for converting said frequency into a voltage.

18. An apparatus as defined in claim 17, wherein said timing means includes trigger means for converting said speed signal into said timing signal.

19. An apparatus as defined in claim 18, wherein said modulation means includes:
- capacitance means for charging toward a predetermined voltage;
- control means for preventing said capacitance means from charging when said disable signal is provided to said modulation means and for enabling said capacitance means to charge when said timing signal and no disable signal are provided to said modulation means;
- comparison means for comparing the voltage of said capacitance means to the multiplied speed and air pressure; and
- control signal generator means for commencing a pulse of said control signal when said capacitance means is enabled by said control means and for maintaining said pulse until said comparison means determines the voltage of said capacitance means equals the multiplied speed and air pressure.

20. An apparatus as defined in claim 16, wherein said modulation means includes:
- capacitance means for charging toward a predetermined voltage;
- control means for preventing said capacitance means from charging when said disable signal is provided to said modulation means and for enabling said capacitance means to charge when said timing signal and no disable signal are provided to said modulation means;
- comparison means for comparing the voltage of said capacitance means to the multiplied speed and air pressure; and
- control signal generator means for commencing a pulse of said control signal when said capacitance means is enabled by said control means and for maintaining said pulse until said comparison means determines the voltage of said capacitance means equals the multiplied speed and air pressure.

21. An apparatus for adding fuel to a spark-ignition engine including an intake manifold and a fuel injector, said apparatus comprising:
- detector means for sensing the speed of the engine and for generating an electrical signal corresponding to the sensed speed;
- divider means for dividing said corresponding electrical signal by a predetermined number, thereby providing an analog speed signal having a frequency;
- frequency-to-voltage converter means for converting said analog speed signal into a voltage, $V_R$, proportional to the frequency of said analog speed signal;
- timing means for generating a timing signal for each cycle of the frequency of said analog speed signal;
- pressure sensing means for sensing the air pressure in the intake manifold and for generating a voltage, $V_p$, proportional to the sensed air pressure;
- air flow threshold means for comparing a product of $V_R$ and $V_p$ to a predetermined threshold voltage having a magnitude representing approximately the maximum naturally aspirated air flow of the engine at the maximum speed of the engine and for generating a disable signal when the product is less than said predetermined threshold voltage;
- multiplier means for multiplying $V_R$ and $V_p$ to derive a modulation voltage, $V_m$; and
- modulation means, responsive to said timing signal, said disable signal and said $V_m$, for generating a control signal for controlling the fuel injector.

22. An apparatus as defined in claim 21, wherein said modulation means includes:
- a capacitor; and
- integrated circuit means including:
  - reset means for receiving said disable signal;
  - trigger means for receiving said timing signal;
  - control voltage means for receiving said $V_m$;
  - discharge means for discharging said capacitor; and capacitor threshold means for receiving a voltage to which said capacitor charges when said discharging means is not discharging said capacitor means.

23. An apparatus as defined in claim 22, wherein each cycle of the frequency of said analog speed signal represents one revolution of the engine.

24. An apparatus as defined in claim 23, wherein said detector means includes low-pass filter means.

25. An apparatus as defined in claim 21, wherein each cycle of the frequency of said analog speed signal represents one revolution of the engine.

26. An apparatus as defined in claim 21, wherein said modulation means includes:
  capacitance means for charging toward a predetermined voltage;
  control means for preventing said capacitance means from charging when said disable signal is provided to said modulation means and for enabling said capacitance means to charge when said timing signal and no disable signal are provided to said modulation means;
  comparison means for comparing the voltage of said capacitance means to said $V_m$; and
  control signal generator means for commencing a pulse of said control signal when said capacitance means is enabled by said control means and for maintaining said pulse until said comparison means determines the voltage of said capacitance means equals said $V_m$.

27. An apparatus for supplying fuel to an engine having a fuel system, said apparatus comprising:
  speed sensing means for sensing the speed of the engine;
  pressure sensing means for sensing a pressure in said engine;
  multiplier means for multiplying the sensed speed by the sensed pressure;
  modulation means, responsive to said multiplier means, for generating a control signal for controlling the fuel system to flow additional fuel so that the additional fuel flow provides an air/fuel ratio by which power output of the engine is increased, said control signal being proportional to the multiplied sensed speed and pressure, said modulation means including a trigger input;
  threshold means for disabling said modulation means when a condition proportional to the sensed pressure is below a predetermined value; and
  timing means for providing a timing signal to said trigger input of said modulation means once during each revolution of the engine so that said control signal commences once during each revolution of the engine in response to said timing signal when said modulation means is not disabled by said threshold means.

28. An apparatus for supplying fuel to an engine having a fuel system, said apparatus comprising:
  speed sensing means for sensing the speed of the engine;
  pressure sensing means for sensing a pressure in said engine;
  multiplier means for multiplying the sensed speed by the sensed pressure;
  modulation means, responsive to said multiplier means, for generating a control signal for controlling the fuel system, said control signal being proportional to the multiplied sensed speed and pressure; and
  threshold means for disabling said modulation means when a condition proportional to the sensed pressure is below a predetermined value;
  wherein said fuel system is controlled to provide additional fuel in the amount of approximately $K_{NA}|N\rho_R - N_{max}|$ (lbs./hr.), where $K_{NA} = (\frac{1}{2}) \times V_D \times \eta_v \times \rho_{as} \times (1/AF) \times 60$,
N = actual engine speed (rev./min.),
$\rho_R$ = density ratio of air density at a given pressure to $\rho_{as}$, and
$N_{max}$ = maximum engine speed (rev./min.), and where
$V_D$ = swept volume of the engine (ft.$^3$),
$\eta_v$ = volumetric efficiency (%),
$\rho_{as}$ = air density at standard temperature and pressure (lbs. air/ft.$^3$), and
AF = mass ratio of air to fuel (lbs. air/lbs. fuel).

* * * * *

UNITED STATES PATENT AND TRADEMARK OFFICE
CERTIFICATE OF CORRECTION

PATENT NO. : 4,557,238
DATED : December 10, 1985
INVENTOR(S) : Charles L. Kuehnl It is certified that error appears in the above-identified patent and that said Letters Patent are hereby corrected as shown below:

Column 1, line 20, change "$N_v$" to -- $\eta_v$ --;

Column 1, line 21, change "$P_a$" to -- $\rho_a$ --;

Column 7, line 34, change "$V_p 1$" to -- $V_p$ --; and

Column 7, line 35, change "$V_p 1$" to -- $V_p$ --.

Signed and Sealed this

Twenty-fifth Day of February 1986

[SEAL]

Attest:

DONALD J. QUIGG

Attesting Officer     Commissioner of Patents and Trademarks